United States Patent
Vanuytven (10) Patent No.: US 8,599,060 B2
(45) Date of Patent: Dec. 3, 2013

(54) CLUTTER REDUCTION IN DETECTION SYSTEMS

(75) Inventor: P. G. Marcel Vanuytven, Geel (BE)

(73) Assignee: Intersoft Electronics NV, Olen (BE)

(*) Notice: Subject to any disclaimer, the term of this patent is extended or adjusted under 35 U.S.C. 154(b) by 365 days.

(21) Appl. No.: 13/121,045

(22) PCT Filed: Sep. 30, 2009

(86) PCT No.: PCT/EP2009/062672
§ 371 (c)(1),
(2), (4) Date: Mar. 25, 2011

(87) PCT Pub. No.: WO2010/037770
PCT Pub. Date: Apr. 8, 2010

(65) Prior Publication Data
US 2011/0181455 A1   Jul. 28, 2011

(30) Foreign Application Priority Data
Sep. 30, 2008 (GB) .................................. 0817885.7
Sep. 25, 2009 (BE) .............................. BE2009/0595

(51) Int. Cl.
*G01S 13/524* (2006.01)
(52) U.S. Cl.
USPC ............... 342/36; 342/37; 342/159; 342/160; 342/162; 342/163; 342/174; 342/205
(58) Field of Classification Search
USPC ................. 342/36, 37, 39, 159–163, 174, 205
See application file for complete search history.

(56) References Cited

U.S. PATENT DOCUMENTS

| 3,707,718 A | * | 12/1972 | Ames ............................ 342/100 |
| 3,720,941 A | | 3/1973 | Ares |
| 3,815,134 A | * | 6/1974 | Jones ............................ 342/159 |
| 5,103,233 A | * | 4/1992 | Gallagher et al. ............ 342/408 |
| 5,309,161 A | * | 5/1994 | Urkowitz et al. ............. 342/132 |
| 5,473,332 A | * | 12/1995 | James et al. .................. 342/159 |

(Continued)

FOREIGN PATENT DOCUMENTS

| WO | 2004077093 | 9/2004 |
| WO | WO 2010037770 A1 * | 4/2010 |

OTHER PUBLICATIONS

Pierucci, L.; Bocchi, L., "Detection of runway boundary in ATC ground radar," Radar Conference, 2010 IEEE, vol., No., pp. 418,421, May 10-14 2010.*

(Continued)

*Primary Examiner* — John B Sotomayor
(74) *Attorney, Agent, or Firm* — Bacon & Thomas, PLLC (57) ABSTRACT

The present invention relates to a system (300) for reducing or cancelling unwanted signals when detecting objects of interest with a detection system (200). The detection system thereby is an antenna based system using two or more receive beams as echo response to an emission signal. The system (300) for reducing or cancelling unwanted signals comprises an input means (310) adapted for obtaining from said antenna system (210) receive signals from a first receive beam and receive signals from at least one second receive beam responsive to the same emission signal. It furthermore comprises a coupling means (320) adapted for coupling the receive signals from the first receive beam to the receive signals from the at least one second receive beam, so as to obtain a detection signal for the objects of interest with suppressed unwanted signal contribution.

15 Claims, 6 Drawing Sheets

(56) References Cited

U.S. PATENT DOCUMENTS 5,760,734 A * 6/1998 Urkowitz ............... 342/159
7,675,458 B2 * 3/2010 Hubbard et al. ............... 342/159
2011/0181455 A1 * 7/2011 Vanuytven ............... 342/27

OTHER PUBLICATIONS

Inseok Hwang; Balakrishnan, H.; Roy, K.; Tomlin, C., "Multiple-target tracking and identity management in clutter, with application to aircraft tracking," American Control Conference, 2004. Proceedings of the 2004, vol. 4, No., pp. 3422,3428 vol. 4, Jun. 30, 2004-Jul. 2, 2004.*

Farina, A.; Pardini, S., "Survey of radar data-processing techniques in air-traffic-control and surveillance systems," Communications, Radar and Signal Processing, IEE Proceedings F, vol. 127, No. 3, pp. 190,204, Jun. 1980.*

International Search Report in PCT/EP2009/062672, Feb. 12, 2010.

Written Opinion of ISA in PCT/EP2009/062672, Feb. 12, 2010.

Applicant response to Written Opinion in PCT/EP2009/1062672, Jul. 23, 2010.

I.P.R.P. in PCT/EP2009/1062672, Jan. 11, 2011.

Communication from the EPO regarding European Patent Application EP 09 760 123.1, dated Oct. 19, 2012 (5 pages).

* cited by examiner

CLUTTER REDUCTION IN DETECTION SYSTEMS

CROSS REFERENCE

This application is the national stage entry of international application PCT/EP2009/062672, filed on Sep. 30, 2009, which claims the benefit of British application GB 0817885.7, filed Sep. 30, 2008 and Belgium application BE 2009/0595, filed on Sep. 25, 2009, the entirety of said applications being incorporated herein by reference.

TECHNICAL FIELD OF THE INVENTION

The present invention relates to the field of signal detection, such as for example radar detection or sonar detection. More particularly, the present invention relates to methods and systems for reducing or cancelling clutter in signal detection such as for example radar detection or sonar detection.

BACKGROUND OF THE INVENTION

Detection of the presence, position and/or speed of objects is common, especially in traffic, such as for example civil and military air traffic control, in parking assistance devices, navigation or undersea detection of objects, etc. Several detection systems are known, most of them using a "transmitter beam" and "antenna beam" to focus energy to "targets" and measure the return signals using the same or other "antenna" and a "receiver" to identify targets and measure their parameters. Such systems can use the sound wave properties in applications like "sonar" or electromagnetic wave signals as in the case of "radar" or similar technologies.

The coverage of such measurement system is limited by what is known as "line of sight", i.e. the "antenna" needs to be located at a position with a view to the targets as unwanted objects or objects that are not of interest in between the antenna and the target can disturb detection or even prevent detection of the targets. Nevertheless, such unwanted objects are often unavoidable and unwanted detections of these objects can make it difficult to trace the targets of interest. Unwanted detections are called "clutter" and need to be rejected as they are obscuring the view of the observer.

Clutter rejection is a major and difficult issue in signal processing. For example in radar signal processing, the intensity of clutter from man-made constructions, forest, hills and mountains are usually several orders of magnitudes stronger than the returned signal of for instance a small aircraft. Very sophisticated techniques have been developed over a period of 50 years to minimize the impact of clutter to the detection of aircraft. Among these methods are the "MTI" (moving target indicator) technique and the "MTD" (moving target detector) technique and techniques using Doppler signal processing. Due to advances in computer technology, this has lead to a clutter level that is considered workable. On the side of hardware, better antennas with lower side lobes have been developed in order to reduce the illumination of the ground level where most of the returned clutter signals are received from. Unfortunately the level of side lobe reduction has practical limits induced by antenna size cost and environment.

A large number of solutions are focussed on filtering towards the properties of signals of interest. More specifically, the spectral content of a return signal is used to filter and reduce the clutter intensity. The latter can be based on the fact that moving targets exhibit a Doppler shift. However in doing so, signals representative of targets with low radial speed and arriving at the receiver at the same time as clutter signals are also rejected. As Doppler shift is proportional to the radial speed of the target, objects performing a tangential flight above a clutter area have a considerably reduced detection probability. Furthermore most radars have a range requirement that limits their Doppler filter capabilities. Air traffic Control (ATC) radars suffer from "blind speed" problems: if the sampling rate of the radar is not fast enough, under sampling occurs and the target can appear to be stationary to the radar even on a radial flight. In this case it is rejected by the clutter filter. With a radar performance according to the present state of art a clutter reduction of 50 dB is theoretically possible. However the main limitation of clutter filters based on the difference in spectral content of target versus clutter signals lies in the fact that also many clutter objects are not stable at all. Especially "Sea clutter" is a real challenge for any radar hitting the surface of water as the reflectivity is high and the object is often moving in erratic ways.

Another problem for accurate detection is the distance-dependency of clutter. In larger ranges where a radar or sonar is active, the clutter is usually low as Earth curvature limits the objects in view. In shorter ranges, the clutter signals rises very strong, as can be seen from the path loss formula presenting an inverse fourth order law with range. In fact most airport radars need to use additional measures in order not to saturate the receiver with too much clutter. If saturation takes place the MTI mechanisms fail to work and the target is lost for all speeds. Two methods are usually present to maintain the return signals in the dynamic range of the receiver.

1) The vertical antenna beam is designed asymmetrical to "roll-off" below a set elevation angle thereby reducing return signals from low elevation.

Figure 1A:
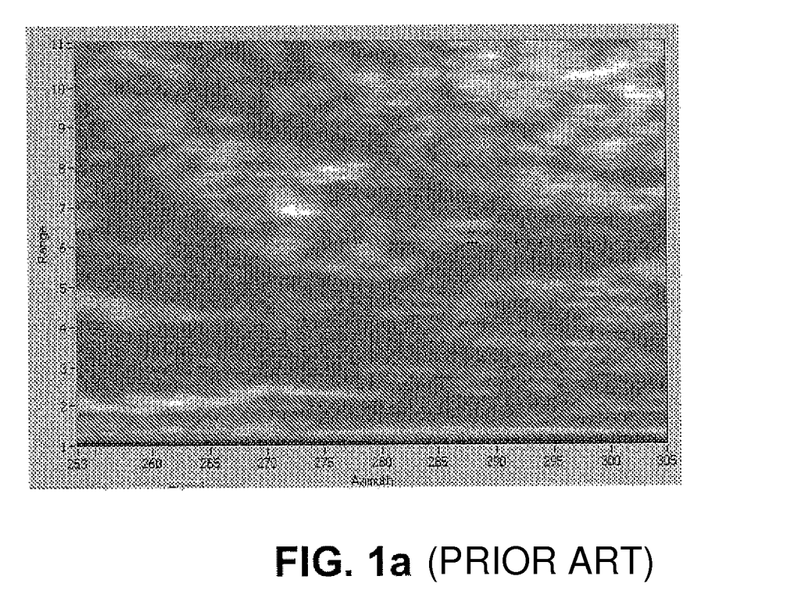
FIG. 1a—prior art is an exemplary illustration of radar detection using a low beam for a system with switchable beam, as is used in radar detection systems according to prior art.
Figure 1B:
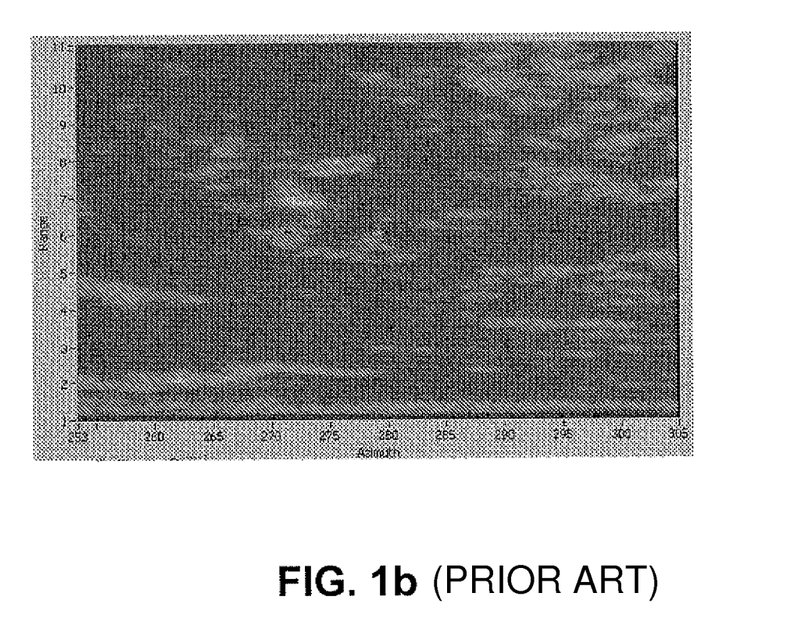
FIG. 1b—prior art is an exemplary illustration of radar detection using a high beam for a system with switchable beam, as is used in radar detection systems according to prior art.

2) Most antennas have two or more beams pointing to a different elevation angles. For the first few hundred microsecond after transmission the "high-beam" (HB) is switched to the receiver. When the clutter returns are below saturation level the "low-beam" (LB) is used. To illustrate the effect, exemplary pictures FIG. 1a and FIG. 1b are provided, showing a zoom of the image available on the output of a radar receiver. FIG. 1a shows the signals when the low-beam LB is used whereby it can be seen that the view is completely cluttered with signals up to saturation level, completely masking a possible target of interest. The video on the HB is reducing the number of blips and brings the signals within the dynamic range of the receiver allowing further signal processing.

Figure 2:
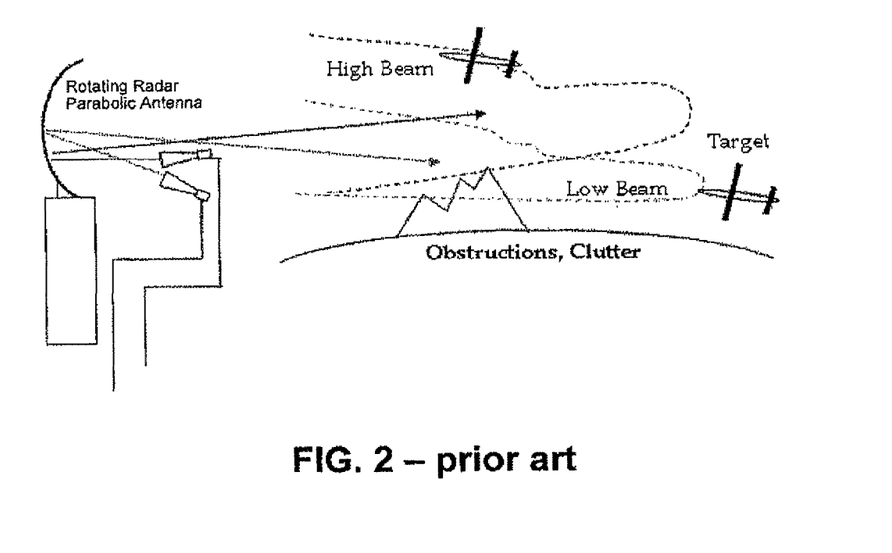
FIG. 2 illustrates a schematic representation of a dual beam radar antenna setup, e.g. as used at airports, according to prior art.
Figure 3:
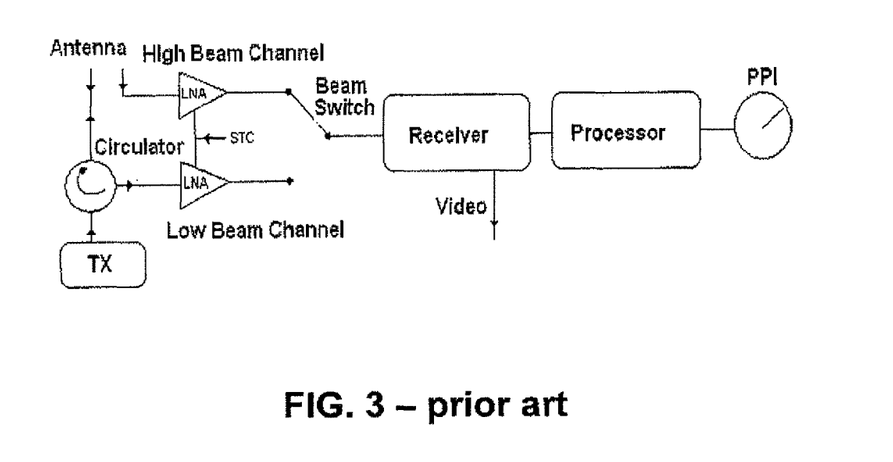
FIG. 3 illustrates a schematic representation of a signal processing chain as used in prior art for processing signals from a dual beam radar antenna setup.

FIG. 2 illustrates a typical radar setup as used for tracking airport traffic. It shows a radar setup for a radar with dual beam, a low beam (LB) for tracking objects with lower elevation and a high beam (HB) for tracking objects with higher elevation. The transmitter is typically connected using a circulator to the LB since most of the power is required to illuminate targets at the largest distance who suffer from the highest path loss attenuation. After the emitter pulse has left the antenna, the receiver is first connected to the high beam (HB) as targets are expected at higher elevation angles and at short range clutter is too strong to point lower. After some elapsed and programmable time the receiver is switched to the lower beam as target elevation angle is lower on further range (corresponding with longer response time) and the antenna pointing angle must be lower to have enough gain on the target. A schematic representation of a processing system for processing signals according to this method is shown in FIG. 3.

Switching may be used as a coarse filter. This provides about 20 dB of clutter reduction at the expense of reducing the detection of low flying targets. The beam switch measure as such furthermore often is not enough to deal with saturation and usually "STC" (Sensitivity Time Control) is used to further attenuate signals that are too strong on short range. In order to allow such attenuation, memory maps controlled in azimuth and range are tuned on site in order to prevent the need for using all these attenuation mechanisms throughout the whole range to be scanned, as these attenuation mechanisms will also reduce the signals of objects of interest. As the intensity and position of clutter is affected by seasonal and weather effects the present clutter suppression mechanisms, that require labor intensive handcraft tuning, are set for worse case conditions and are often hindering proper aircraft detection unnecessary. This all results in the situation that only strong (large) targets can be observed in the areas of high clutter.

The signal of the receiver is fed to a processing module that can integrate the coherent responses of targets to receive processing gain while, if required, reducing the clutter by moving target indicator processing (MTI) and Doppler processing. These techniques are done in the frequency domain. A disadvantage of these techniques is that detections are missed when the targets have similar Doppler properties as clutter. False detections are created when clutter has different spectral content that can be filtered off. It thereby is a disadvantage that false detections will increase the detection threshold for a given area resulting in missing true targets of interest.

In view of the drawbacks of these clutter rejection filters, the probability of detection ($P_d$) of a typical dual frequency ATC PSR radar is rarely better than 90%. Most of the missed detection signals (10%) are due to the strong clutter signals.

It is to be noticed that remarkably in the past 20 years there has been shown little or no progress on this subject with the exception of the use of extremely expensive "phase array antennas", where the antenna technique is used to a maximum to avoid illuminating clutter areas by tracking the horizon. Still this method requires the use of sensitivity time control to reduce the signals received through side lobes on short range and thus is masking the detection of low flying objects when the horizon screening angle is high as in mountain areas.

SUMMARY OF THE INVENTION

It is an object of embodiments of the present invention to provide systems and methods for detecting objects of interest with a high detection probability. The above objective is accomplished by a method and device according to the present invention.

The present invention relates to a system for suppressing unwanted signals when detecting objects of interest with a detection system comprising an antenna system using two or more receive beams, the system comprising an input means adapted for obtaining from said antenna system receive signals from a first receive beam and receive signals from at least one second receive beam responsive to the same emission signal, and a coupling means adapted for coupling the receive signals from the first receive beam to the receive signals from the at least one second receive beam, so as to obtain a detection signal for the objects of interest with suppressed unwanted signal contribution.

The coupling means may be adapted for inducing a local electronic notch in the detection signal at a position of an unwanted signal contribution. The local electronic notch may be generated by coupling the receive signals in counterphase.

The detection signal may express a presence or property of an object as function of an azimuth angle, elevation and range with respect to the antenna system and the coupling means may be adapted for substantially reducing or cancelling the detection signal for a selected elevation angle.

The coupling means may be adapted for coupling the receive signals differently as function of a range between an object for which a receive signal is obtained and the antenna system.

The coupling means may be furthermore adapted for coupling the receive signals in phase for detection signals wherein no unwanted signals are present.

It is to be noticed that each azimuth/range cell can contain clutter or can be free of clutter. The latter usually occurs because it is in the shadow of a high object on shorter range. The system thus also may be adapted, in addition to cancelling of clutter in cells containing clutter, for combining receive signals of both beams in phase to increase gain. This increases sensitivity for the gaps between clutter where in prior art systems the gain was reduced by only selecting the high beam.

The coupling means may comprise vector modulators for modulating the receive signals for the first beam and the receive signals for the second beam, and a combiner for combining the modulated received signals.

The system furthermore may comprise a calibration processor for deriving coupling parameters for coupling the receive signals of the first beam and receive signals of the at least one second receive beam so as to obtain a detection signal for the objects of interest with suppressed unwanted signal contribution. The calibration processor may be adapted for deriving coupling parameters so that a part of the received signals of the first beam is combined with the received signals of the second beam, the part of the received signal of the first receive beam introducing an unwanted signal at a predetermined location being equal in amplitude as but in counter phase with an unwanted signal at that predetermined location present in the received signals of the second beam.

The coupling means can be adaptively tuned to null unwanted signals by adaptively altering a coupling amplitude and phase.

The coupling means may be adapted for providing coupling taking into account gain as function of elevation azimuth and range.

The present invention also relates to a detection system for detecting objects of interest, the detection system comprising an antenna system adapted for obtaining two or more receive beams and for determining a detection signal of objects of interest, and a system for reducing or cancelling unwanted signals in the detection signal of the objects of interest as described above.

The present invention furthermore relates to a calibration processor for use in a system for reducing unwanted signals as described above, the processor being adapted for determining coupling parameters for coupling receive signals from the first receive beam and receive signals from the second receive beam.

The present invention also relates to a method for detecting objects of interest, the method comprising emitting an emission signal towards objects of interest, receiving receive signals in a first beam and receive signals in a second beam, being an echo response to the same emission signal, and coupling said receive signals in a first beam to said receive signals in a second beam so as to obtain a coupled signal being a detection signal for objects of interest having suppressed unwanted signals.

The present invention furthermore relates to a method for upgrading a detection system comprising an antenna using two or more receive beams and a means for switching between the two or more receive beams, the method comprising replacing the switching means by a means for coupling said receive signals in a first beam to said receive signals in a second beam so as to obtain a coupled signal being a detection signal for objects of interest having suppressed unwanted signals.

It is an advantage of embodiments of the present invention that improvements are not based on modifying the power of the transmitter as this is subject to physical limitations that seem to have been reached already.

It is an advantage of embodiments of the present invention that improvements are not based on modifying the sensitivity of the receiver as progress there is subject to physical limitations that seem to have been reached already.

It is an advantage of embodiments of the present invention that improvements are not based on modifications in the antenna shapes as these may be unpractical and often are very expensive.

It is an advantage of embodiments according to the present invention that the clutter signal is cancelled at a very early point in the radar chain, so that saturation can be avoided. It is an advantage of embodiments according to the present invention that the clutter signal is cancelled at a very early point in the radar chain, so that there is no need for a strong sensitivity time control (STC) action.

It is an advantage of embodiments that real time data is used for reducing or cancelling clutter as such embodiments do not suffer from instabilities in the antenna and/or in the clutter.

It is an advantage of embodiments according to the present invention that the system and/or method can reduce, filter or even cancel the clutter. The latter results in an reduction or avoiding of loss of detection of targets.

It is an advantage of embodiments according to the present invention that the system and/or method does not suffer from blind speeds and/or problems with tangentially moving targets.

It is an advantage of embodiments according to the present invention that coverage of the detection system for low angle targets of interest, e.g. close to an airport, can be good.

It is an advantage of embodiments according to the present invention that the system and/or method can also reduce or cancel unstable clutter, such as for example sea clutter or signals from wind turbines.

It is an advantage of embodiments according to the present invention that the system and/or method can maintain detection from a helicopter or ULM, while still reducing or avoiding clutter.

It is an advantage of embodiments according to the present invention that the system and/or method provides accurate clutter reduction and/or clutter cancellation without the requirement for expensive radar designs, making it for example possible to use a magnetron transmitter as source, resulting in more cost efficient systems.

It is an advantage of embodiments according to the present invention that initialization, maintenance and more in general site tuning of the radar on the site can be reduced in time, resulting in a reduced cost, both in time and in expenses.

It is an advantage of embodiments according to the present invention that tuning can be made less dependent or independent of weather or seasonal effects.

It is an advantage of embodiments according to the present invention that the system and/or method is adapted for automatically reducing or suppressing the effect of jammers.

It is an advantage of embodiments according to the present invention that the system and/or method is adapted for use with different types of detection systems, such as for example radar, but also other types of detection systems such as sonar etc.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only without limiting the scope of the invention. The reference figures quoted below refer to the attached drawings.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore; the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms or definitions are provided solely to aid in the understanding of the invention.

In the present application the term "clutter" is used for referring to unwanted signals in a detection system, more particularly for referring to unwanted echoes in electronic systems, such as for example in radars or sonars.

Methods for reducing or cancelling clutter according to embodiments of the present invention also may be referred to as VCC methods or Vanuytven Clutter Canceller methods. Systems for reducing or cancelling clutter according to embodiments of the present invention also may be referred to as VCC systems or Vanuytven Clutter Canceller systems.

In particular embodiments or examples, the terms "low beam" and "high beam" are used. The term "low beam" is used to refer to a receive beam for receiving signals from an elevation interval corresponding with a volume closer to the ground level than the "high beam". Often the low beam is more subject to clutter than the high beam as clutter often occurs more frequently near ground level.

According to a first aspect, the present invention relates to a system for reducing or even cancelling unwanted signals, also referred to as clutter, when detecting objects of interest in a detection system. Clutter may for example refer to signals returned from ground, sea, rain, animals including insects, atmospheric turbulances, environmental objects, etc. Clutter is a major issue in detection such as radar detection or sonar detection as it can cause serious performance issues with respect to the detection accuracy of objects of interest. The system according to embodiments of the present invention comprises an input means adapted for obtaining a receive signals from a first beam and at least receive signals from a second beam from an antenna using two or more receive beams, as response to a same emission signal. In other words, embodiments according to the present invention use responses of at least two beams detected in response to the same emission signal, each of them capturing information from different elevation angle intervals. The system thus may be suitable for being connected to two receivers of a dual beam antenna or an antenna with more beams. The system may for example be operated in combination with a dual beam antenna, having a high receive beam and a low receive beam, as often used in radar applications. Optionally, the system for reducing or cancelling unwanted signals may be incorporated in a detection system. In embodiments of the present invention, the term first beam or first receive beam may be used to refer to a beam comprising receive signals that comprise more clutter than a second receive beam used in the system or method and vice versa, the terms second receive beam or second beam may be used to refer to a beam comprising receive signals comprising less clutter than the first receive beam used in the system or method.

The system furthermore comprises a coupling means adapted for coupling the receive signals from a first beam with the receive signals from at least a second beam so as to reduce clutter in the detection image. Reduction of clutter thereby may be obtained with reference to images obtained using only high beam or low beam or obtained by switching between these images. For this coupling, the coupling means may store or use coupling information, such as for example coupling parameters, expressing the coupling between the first and the at least second beam to be applied. The coupling information may comprise a coupling amplitude and/or phase angle. The detection volume of interest may be divided in a plurality of sub-volumes characterised by a given range interval and a given azimuth angle interval, thus defining a plurality of azimuth-range cells together describing the volume of interest for detection. Coupling information may therefore comprise coupling information for each azimuth—range cell of interest. The coupling information thus may comprise a set of coupling parameter values for each azimuth-range cell of interest. It thereby is an advantage of embodiments according to the present invention that these allow to provide clutter correction data based on a four dimensional parameter space, expressing gain as function of azimuth, elevation and range. The coupling means may be adapted to output an output signal based on a coupled signal of the first beam and a coupled signal of the at least one second beam.

The coupling information in the coupling means may be provided as predetermined stored values or may be provided using a VCC calibration processor allowing to determine the coupling information. Such coupling information may be determined by the VCC calibration processor at initialisation, at maintenance moments, or at predetermined times during the detection process for updating the clutter correction process to changed clutter conditions. The system therefore may be connectable to a VCC calibration processor adapted for determining coupling factors for coupling receive signals from the first beam with at least receive signals from the second beam, but advantageously the system comprises such a VCC calibration processor.

Figure 4:
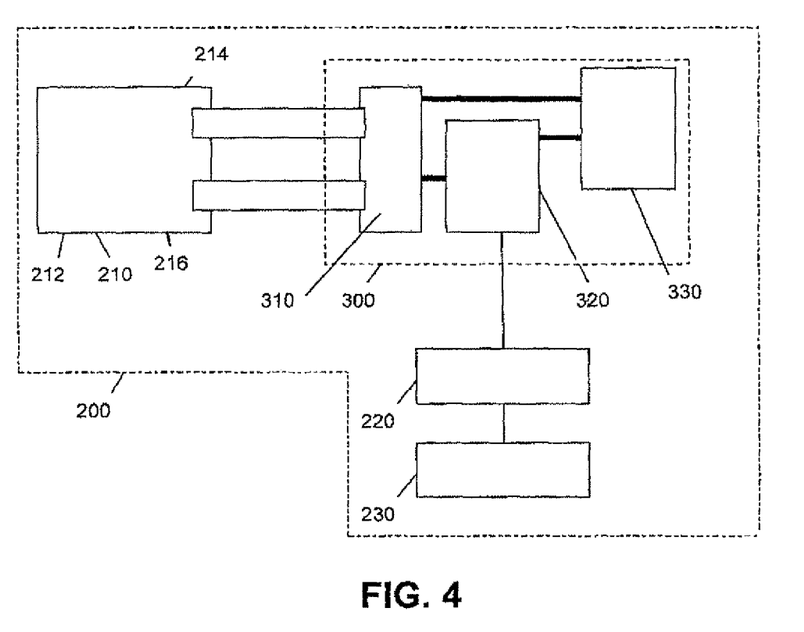
FIG. 4 is a schematic representation of a system for detecting objects with clutter cancellation according to embodiments of the present invention.

These and other components of a system for reducing or even cancelling unwanted signals will be described in more detail below with respect to FIG. 4, showing an exemplary system according to an embodiments of the present invention and illustrating standard and optional components of the system.

The system 300 for reducing or cancelling unwanted signals, according to embodiments of the present invention may be part of a full detection system 200 and/or may be adapted to co-operate with an antenna system 210. The antenna system 210 may comprise an antenna 212 that may be positioned with respect to a transmitter 214, such as for example a magnetron, so as to direct an emission beam, also referred to as antenna beam, as focussed energy to targets. The transmitter 214 also may be a Klystron or solid state amplifier, although this is not required as the clutter reduction or cancelling does less or not require that strong emission intensities or strong coherent stability, as often was the case in prior art systems.

The antenna system 210 furthermore comprises at least two receivers 216, for receiving a return signal, also referred to as echo signal. The transmitter 214 may use the same or similar components as one or more of the receivers, or may be integrated with it. The return signals or receive signals should allow to identify targets and/or measure parameters like presence, position and speed of objects of interest.

It is to be noticed that, where the present aspect describes co-operation with an antenna system or incorporation of the system for reducing or cancelling unwanted signals in a detection system, according to one aspect, the present invention also relates to a full detection system comprising such a system for reducing or cancelling unwanted signals in the detection system.

It is to be noticed that the system 300 for reducing or cancelling unwanted signals may be adapted to co-operate with antenna systems for a variety of detection techniques, such as for example in detection techniques using sound waves like in sonar or in detection techniques using electromagnetic waves like in radar or similar technologies. The system according to embodiments of the present invention is based on detection of echo signals in reply to an emitted signal.

As indicated above, the system 300 for reducing or cancelling unwanted signals, is focussed on reducing or cancelling unwanted signals also referred to as clutter which are obscuring the view for the observer using the system. The system 300 for reducing or cancelling unwanted signals comprises input means 310 adapted for obtaining receive signals from a first beam and for obtaining receive signals from at least a second beam. The input means 310 may comprise one or more input ports for receiving signals from the antenna system 200, e.g. more particularly from the receivers 216. The receive signals may be pre-processed at the input means or prior to receiving them.

The system 300 furthermore comprises a coupling means 320 adapted for coupling receive signals from a first beam and at least receive signals from a second beam. The first beam and at least one second beam typically are selected to receive signals from within different angle-intervals with respect to elevation. The latter may be obtained by varying their vertical angle with respect to the antenna in the antenna system. In some embodiments, the first beam may for example be referred to as the low beam, receiving information from closer to the ground level and often comprising a stronger clutter signal than an at least one second beam optionally referred to as a high beam and receiving information from an elevation also higher above ground level. The coupling means 320 is adapted to use the beam containing a stronger clutter signal for a given detection volume, i.e. a given azimuth-range cell, for compensating for clutter in signals from the beam containing less clutter signal and more target signal. Instead of not using the beam with strongest clutter signal, as previously done in systems switching between different beams, in embodiments of the present invention, part of the receive signals of the beam comprising strongest clutter signal may be added to the receive signals of the beam comprising less clutter signal to thus compensate for clutter. The part to be added is determined by the magnitude and phase of this coupling. The coupling means 320 is adapted to couple the beams so that the clutter in the first beam is substantially equal in amplitude and reverse in phase to the clutter in the at least one second beam, the resulting sum for clutter on the target channel may be substantially zero, i.e. substantially cancelled.

In one embodiment, for a first beam receiving information that is more sensitive to the clutter than the second beam such as for example a low beam receiving receive signals stemming from a space closer to the ground surface, the coupling means uses from the first beam a sample equal in amplitude to the clutter received from the at least a second beam but shifted to the opposite in phase and injected in the receive channel in order to cancel the clutter signal thus avoiding degradation in the receive channel.

The coupling means 320 may comprise the coupling information in a memory, e.g. based on stored values previously determined experimentally or calculated, as a look up table, or receive it via an input from a processor as will be described in more detail below. Such coupling information may for example comprise a coupling amplitude and a phase angle for coupling receive signals from the first beam with receive signals of the at least one second beam. The coupling parameters may be selected so as to generate an electronic notch for reducing or removing clutter at a given elevation. By adapting the coupling parameters, the electronic notch may be positioned or tuned to a different elevation. The parameters thus may be adaptively tuned to reduce or null signals that remain present for a long time, i.e. that may be representative for clutter. Embodiments of the present invention thus may introduce an electronic notch to the received antenna diagram by mixing of the received signals. The coupling information may be determined so as to reduce or cancel clutter at specific 3-dimensional positions. The coupling means 320 therefore advantageously may be adjustable, e.g. through software control. As will be set out below, in advantageous embodiments, the coupling means may be adapted for coupling the first beam and the at least one second beam using different coupling information for different range-azimuth cells of interest. It is an advantage of embodiments according to the present invention that for detection range is taken into account as a paratheter. It thus is an advantage of embodiments according to the present invention that for detection a four dimensional parameter space is taken into account expressing gain versus azimuth, elevation and range. For doing this, the detection volume of interest may be divided in different azimuth-range cells, each being representative for a volume having edges determined by a particular azimuth interval and range interval. Working with a plurality of azimuth-range cells allows to provide an electronic notch for nulling clutter at a predetermined elevation in the azimuth-range cell, for each azimuth-range cell. In this way, the most prominent clutter signal in the azimuth range cell can be reduced or even cancelled. It will be obvious for the person skilled in the art that the quality of the reduction or cancelling of the clutter may depend on the number of range-azimuth cells for which different coupling parameters may be selected, determined or adjusted. The more range-azimuth cells are taken into account, the higher the resolution of the range-azimuth map for which different coupling parameters can be selected and therefore the more clutter signals that can be reduced or even cancelled. Based on the combination of two signals, an electronic notch at a predetermined elevation can be obtained. When signals from more receive beams could be combined, more electronic notches could be introduced, resulting in the possibility to block different clutter signals at different elevations in the same azimuth-range cell, as will be understood by the person skilled in the art.

As nulling the signal in view of clutter can be at different elevation angles for each range azimuth cell, the latter advantageously avoids that targets that happen to be on the same elevation angle but at a different range also are nulled. Consequently, using the present system results in an improved detection capability. It is an advantage of embodiments according to the present invention that embodiments of the present invention take into account range or time of flight as a parameter. Clutter reduction therefore may be performed in a four dimensional parameter space, taking into account gain versus azimuth, range and elevation.

In some embodiments according to the present invention, a particular selection of coupling parameters is made for range-azimuth cells that are positioned in the shadow of an obstruction, i.e. that are in the shadow of a clutter object. According to advantageous embodiments, coupling parameters for range-azimuth cells that do not contain clutter because they are in the shadow behind an obstruction are determined so as to obtain maximum coupling in amplitude and in phase. The latter can be performed because no clutter rejection is required at that position. Using both the first beam and the at least one second beam for these non-clutter cells effectively improves the received signal strength, resulting in improved sensitivity. This can significantly improve low elevation coverage for the radar and can reduce the cone-of-silence as the need for sensitivity time control can be reduced. The latter thus results in a bonus effect of providing a better radar coverage. In some embodiments of the present invention, the beam coupling for clutter free cells thus may be selected so as to have an improved or maximum gain and low elevation coverage thus providing improvement in overall target detection.

In embodiments wherein for different azimuth-range cells, different coupling information is used, the system advantageously comprises an accurate azimuth encoder so as to be able to accurately selecting or distinguishing different azimuth positions. The higher the accuracy of such an azimuth encoder, the more accurate corrections may be performed.

The coupling means 320 has as an output a signal representative of a detection image, wherein the clutter is reduced by combining, i.e. coupling, receive signals of different beams.

The output signal of the coupling means may be further processed in the detection system using a further processor 220. Such processor may be adapted for further processing of the image, such as for example applying Doppler techniques thereto, applying object recognition techniques on the image, allowing further standard processing steps, as known by the person skilled in the art. The further processing means 220 further may be connected to an output 230, allowing to visualise the detection image with reduced or cancelled clutter to the user. Such an output means 230 may be any suitable output means, such as for example a monitor, a printing device, etc., the invention not being limited thereto.

Figure 5:
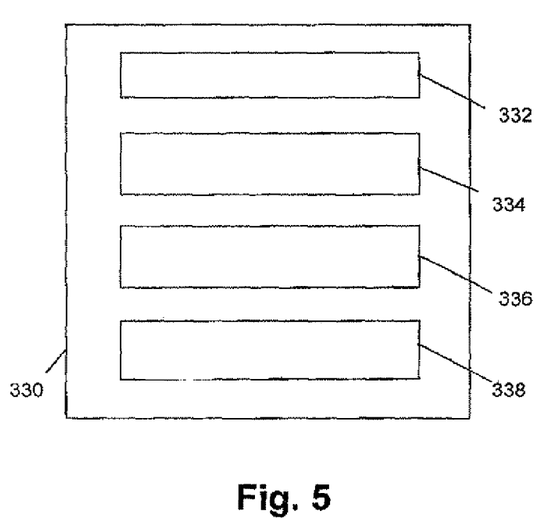
FIG. 5 is a schematic representation of an exemplary calibration processing system as can be used according to an embodiment of the present invention.

As set out above, the coupling means may receive its coupling information from the VCC calibration processor 330, which may be part of the system for reducing or cancelling clutter 300 or may be connectable to it. Advantageously, the VCC calibration processor 330 is part of the system 300 as this more easily allows adjusting the clutter reduction or cancelling at predetermined times during the life time of the detection system, thus being able to adjust to varying clutter conditions. For determining coupling information, the VCC calibration processor 330 may use information from the first beam and from at least a second beam measured simultaneously using the same antenna, identify clutter and determine based thereon coupling information allowing to couple receive signals from the first beam and receive signals from the second beam to reduce or cancel the clutter. The VCC calibration process may be performed at installation, during maintenance, at regular intervals, etc. It may be performed in an automated and/or automatic way. This process may be performed in an automated and/or automatic way. The VCC calibration processor 330 may determine coupling information based on a predetermined algorithm, according to predetermined rules, based on a neural network, etc. The VCC calibration processor 330 may be adapted for determining the coupling information used by the coupling means 320 as set out above. In one particular embodiment according to the present invention, the VCC calibration processor may comprise processing components for performing determination of coupling information, as shown in FIG. 5. The VCC calibration processor 330 may comprise a receiving component 332 for receiving receive signals from the first beam and from the at least one second beam, the first beam suffering more from clutter than the second beam. The latter may be performed via a direct connection with the input means of the system 300, or via a direct connection of the VCC calibration processor 330 with the antenna system 210. The VCC calibration processor 330 furthermore may comprise a clutter identification means 334 that is adapted for identifying clutter based on the input received in the receiving component. The latter may for example be based on a particular signature of the received input, may be based on further input received from an external source, such as for example a person identifying clutter objects and/or may be based on comparison with previously obtained input signals and identification of objects that are present for a long time at the same position and may be considered clutter in a system for detecting objects of interest, e.g. moving objects. The processor therefore optionally also may comprise a memory for storing information received from an external source and/or previously received images. The processor furthermore may be adapted with a coupling information deriving means 336 for deriving coupling information based on the identified clutter in the receive signals from the first beam and the receive signals from the second beam. The latter may comprise means for comparing clutter in the receive signals of the first beam and the receive signals of the second beam and means for deriving from the comparison coupling parameters. Such coupling parameters may be determined by calculating an amplitude and phase so that the contribution of clutter from the first beam in the combined signal is equal to but opposite in sign of the clutter in the second beam, resulting in reduction or cancelling of the clutter in the combined signal. For some portions of the signals, e.g. when these occur in clutter-free cells, the coupling parameters may be selected so that an optimum signal strength can be obtained. Determination of the coupling parameters may be performed by comparing the combined signal with a previously determined signal and thus adaptively altering the coupling parameters until a predetermined or optimum point is reached, determined by predetermined criteria. The system therefore may be adapted for continuously receiving the result of the combined signal as reference or comparison signal, e.g. as a video input. The latter allows adaptive tuning. The processor furthermore comprises an output component 338 for outputting the coupling information to the coupling means. Such processor components may be performed in hardware or in software.

The system and method for reducing or cancelling clutter is especially suitable for systems wherein the relationship between the first beam and the at least one second beam is stable in amplitude and phase, which is for example the case in dual beam systems using two beams for detecting echo signals based on a single antenna or systems using more than two beams to detect echo signals based on the same antenna.

It is an advantage of embodiments according to the present invention that the instability of clutter due to movement of the cluttering object (threes, waves or wind turbines) from pulse to pulse is of no importance since both channels exhibit the same degree of amplitude and phase change for the same clutter cell in space. Therefore it is only require to tune the coupling parameters slightly by iteration from scan to scan to maintain a null dip for that clutter cell. Since the adjustment of parameters is only required when the relationship between the two antenna beams changes, the time constant for adjustment of the clutter correction can be in the order of minutes or hours. In fact this should allow a wind turbine to be rejected while a hovering helicopter is still reported.

The methods and systems according to embodiments of the present invention also can be applied to swept frequency radars. Using software processing of the data of the two beam channels after pulse compression, the coupling parameters may be tuned with fine resolution in range as clutter from different ranges is from different elevation angles. As one beam position is likely to hit multiple clutter objects with different return amplitude and phase the summed clutter vectors can change rapidly with azimuth and range.

Figure 6:
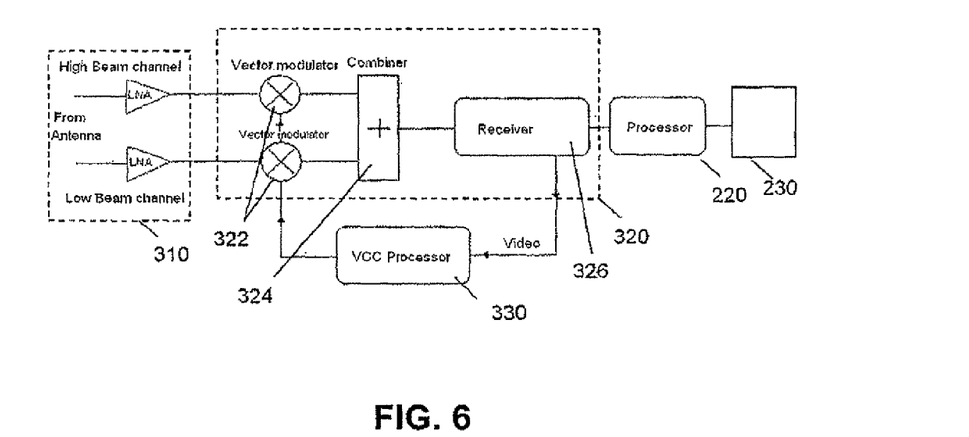
FIG. 6 is a schematic representation of the different steps in an exemplary method for clutter cancellation according to embodiments of the present invention.

By way of illustration, a more specific example of a system for reducing or cancelling unwanted signals is described. The example, shown in FIG. 6, illustrates a system receiving input signals from an antenna system using two receive beams for receiving an echo signal at an input means 310, wherein a programmable coupling means 320 is provided that serves to combine the signals from both receive beams. The programmable coupling means 320 or unit may be programmed so as to couple received signals from the first beam and receive signals from the at least second beam based on a predetermined reference table or look-up table comprising values previously determined or based on a values for minimising clutter and maximising the gain obtained with a VCC calibration processor 330 for determining coupling amplitude and phase angle e.g. based on an amount of clutter sampled for each azimuth-range cell, e.g. using a logic circuit. In the example shown in FIG. 6, the VCC calibration processor is included in the system 300, and the coupling means 320 comprises vector modulators 322 allowing modulating the receive signals of the first beam and the at least one second beam. The vector modulators 322 are driven by the output of the VCC calibration processor 330. The modulated signals then are combined in the combiner 324 and outputted to the receiver 326. In agreement with some embodiments of the present invention, the vector modulator in a high beam receive channel may be used to block the channel for far way ranges, as it is expected that it only adds noise and no useful signal because for a far away range all targets are expected at low elevation.

Whereas the previous example illustrates the VCC coupling unit and the VCC calibration processor being implemented in hardware, one or more of the components may be implemented as software in a more general processing means. If a chirped pulse is used, the VCC calibration processor may be implemented to act after the received signals have been compressed. This function is usually done after a digitizing step. Implementation is especially suitable for systems wherein compression and digitisation of the signals is performed and/or when both beams are simultaneously sampled.

It is an advantage of embodiments according to the present invention that disturbing jammers can be suppressed. Jammers may occur unintentionally for example due to wireless electronics being available and PC's operating with clock frequencies in radar bands as well as intentionally for military purposes to induce hostile signals to disturb operation of the detection system. Special measures need to limit the degradation on target detection. When a jammer signal is present the VCC system will detect this as a form of clutter and place a notch on that elevation angle. As a result there is a reduced clutter suppression for that specific azimuth angle as used by the jammer. Either jammer or the clutter is suppressed depending on which is dominant for the given range azimuth cells.

According to one embodiment of the present invention, the detection system may be combined with a Doppler filtering technique, since it reduces noise by distributing the noise energy on all frequencies while accumulating the target energy in only one Doppler bin to ease detection.

In some embodiments, use may be made of some data on the terrain elevation to help the adaptive tuning mechanisms that control the coupling factors to start tuning with parameters close to the notching of clutter while maximizing gain for target above. Indeed as different settings for creating a notch may be present, the solution with maximum target strength should be chosen.

It is an advantage of embodiments according to the present invention that methods and systems for reducing or even cancelling of clutter according to embodiments of the present invention can be applied to different types of detection systems, e.g. different types of air traffic control radar systems.

It is to be noticed that systems according to embodiments of the present invention detection of a target present exactly at the same elevation for the same range-azimuth cell is not possible, as the signal is nulled in that range-azimuth cell for that elevation. It is to be noticed that the null signals are detected in a four-dimensional space domain and not in the frequency-velocity domain. In other words a target could be reduced in strength when it is close to the same elevation level as clutter and is at the same azimuth and range. It is only disappearing from the radar screen when it is at the same position as the clutter and is present before or after it is at that position. Furthermore, for all practical purposes an airborne target would be in serious trouble anyway if it is at the same elevation, same range and same azimuth as clutter and most probably the use of the radar becomes irrelevant. The latter nevertheless results in the VCC methods and systems being less suitable for detection systems that are intended to track targets at ground (clutter) level.

Furthermore it is possible that for a given range-azimuth cell there is more than one object involved at a different elevation angle. In this event the strongest clutter return can be canceled but some residual signal will sustain. However it is expected that such clutter types are very rare. When more than two antenna beams are available a second use of the VCC method could be cascaded to reject a second elevation angle.

It is an advantage of embodiments according to the present invention that, in contrast to beam pointing techniques (3D radar) the target and clutter object can be illuminated simultaneously while the clutter is canceled dynamically in the receive channel only.

It is to be noticed that, whereas in the above description the system has been described with reference to the full system for reducing or cancelling clutter comprising or connectable to the VCC calibration processor, in one aspect, the present invention also relates to a VCC calibration processor as described above as such.

According to another aspect of the present invention, embodiments of the present invention relate to a method for detecting objects of interest. The method may advantageously take use of a system for reducing clutter as described in the first aspect although the invention is not limited thereto. The method may comprise a step of providing an emission signal or may be response thereto. Providing an emission signal may comprise using a high intensity source, although the present invention is not limited thereto. The method furthermore comprises receiving receive signals in a first beam and a second beam, being responses to the same emission signal but capturing different but overlapping elevation intervals of the region of interest to be covered. The detection system furthermore comprises coupling receive signals from the first beam to receive signals from the second beam to obtain an output with reduced clutter with respect to the signals in the first beam and/or the signals in the second beam. The method therefore may comprise one or more of the steps as may be performed using a system for reducing or cancelling clutter as described above in more detail.

In another aspect the present invention also relates to a method for determining coupling parameters for coupling signals of at least two receive beams as may be performed using the VCC calibration processor as described above.

According to still a further aspect, embodiments of the present invention also relate to a method for upgrading a detection system for detecting objects of interest. The method is especially suitable for upgrading detection systems comprising an antenna with at least two receive beams adapted for switching between the two receive beams. Such detection systems are widely spread on the market and often used for detection of objects of interest at present, such as for example for air traffic control. The method for upgrading comprises replacing a switch for switching between at least two receive beams by a system for reducing clutter adapted for combining, e.g. coupling, signals from the first receive beam and at least a second receive beam. It thereby is an advantage that the detection system can be substantially improved with respect to its accuracy, while not requiring to replace the complete antenna. The system for reducing or cancelling clutter may be as described in the first aspect of the present invention. It is an advantage of embodiments according to the present invention that the method for upgrading can be performed quick. The method may be especially useful in the field of radar detection, although embodiments of the present invention are not limited thereto. It is an advantage of embodiments according to the present invention that these may assist in extending the lifetime for the detection systems.

Some of the embodiments are described hereabove as systems, processors or components thereof, implementing a method or combination of elements of a method. The corresponding method or method steps as can be obtained with the system, processor or the components for carrying out the function consequently also are embodiments according to aspects of the present invention.

Figure 7:
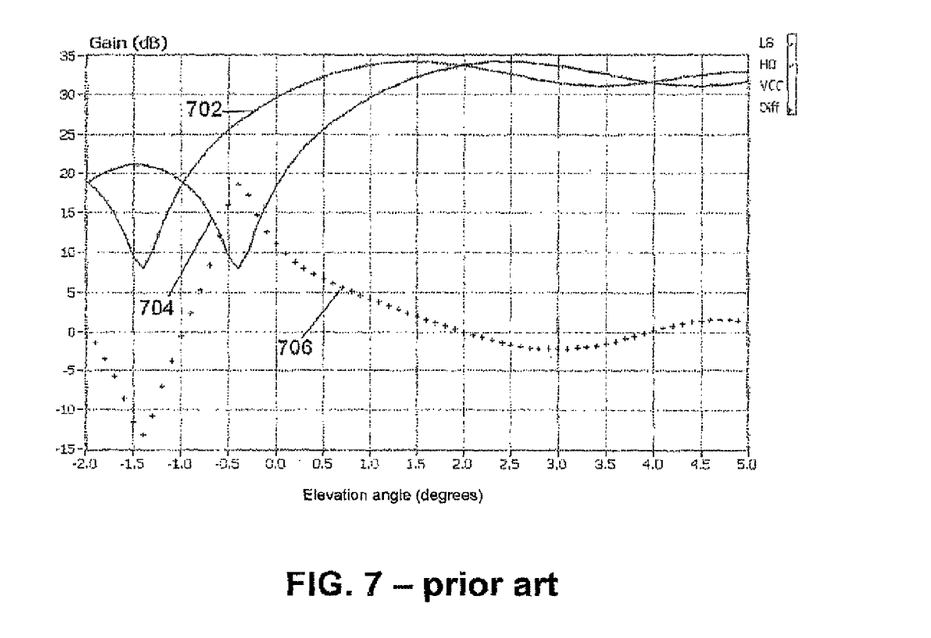
FIG. 7—prior art describes a vertical antenna diagram indicating gain versus elevation for a low receive beam and a high receive beam in an antenna switching between the two beams according to prior art.

By way of illustration, embodiments of the present invention not being limited thereto, an example of the use of a VCC clutter reduction system and method are shown below. The example provided is based on a typical air traffic control radar, but it will be clear to the person skilled in the art that it can be applied mutates mutandis to other detection systems based on echo detection and detection of at least two receive beams under different angle. The particular example illustrates features and advantages of embodiments according to the present invention as can be used in typical airport approach radar systems using a two beam antenna, as illustrated in FIG. 2. It was discussed with reference to FIG. 3 how conventional systems using a beam switch are operated. In FIG. 7—prior art, a typical vertical antenna diagram that can be obtained for a low receive beam and a high receive beam, as used in prior art systems as shown in FIG. 3, is shown. The diagram shows the gain as function of the elevation angle. The red line 702 represents the antenna gain for the low beam (LB). It can be seen that there is a maximum of 34 dB gain at about 1.5 degree elevation. This low beam intercepts the strong clutter mostly located between 0 and −0.5 degree with around 28 dB gain and consequently will saturate the receiver. On the short range prior art systems select the high beam (HB) presented by the green line 704 and thus point upwards to place a notch on the expected location of clutter. This lowers the gain on clutter ideally by 20 dB but since not all clutter is located at the same elevation an average improvement of around 15 dB can be expected for this antenna. The dotted line 706 represents the difference in gain between HB and LB. In the area of clutter there is a strong difference that can be used to cancel the clutter in the HB.

Figure 8:
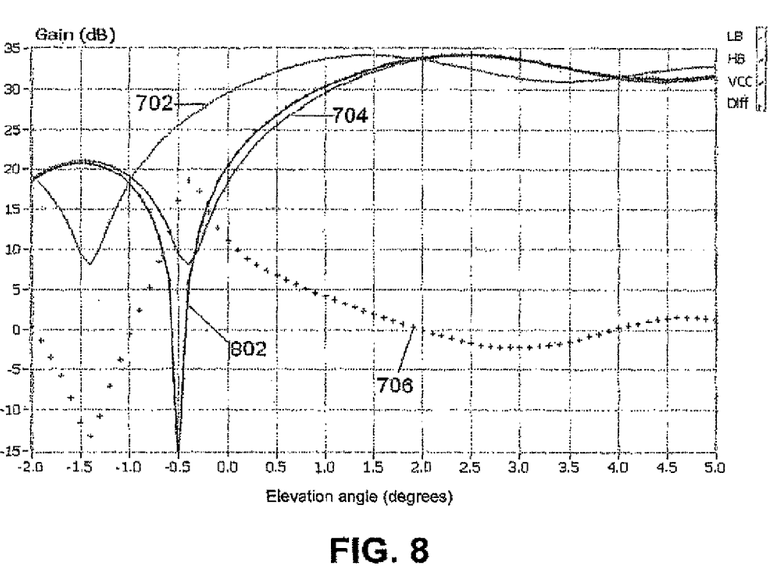
FIG. 8 describes a vertical antenna diagram indicating how coupling of low receive beam signals and high receive beam signals can result in significant reduction of clutter at an elevation of −0.5 degrees, as can be obtained using embodiments of the present invention.
Figure 9:
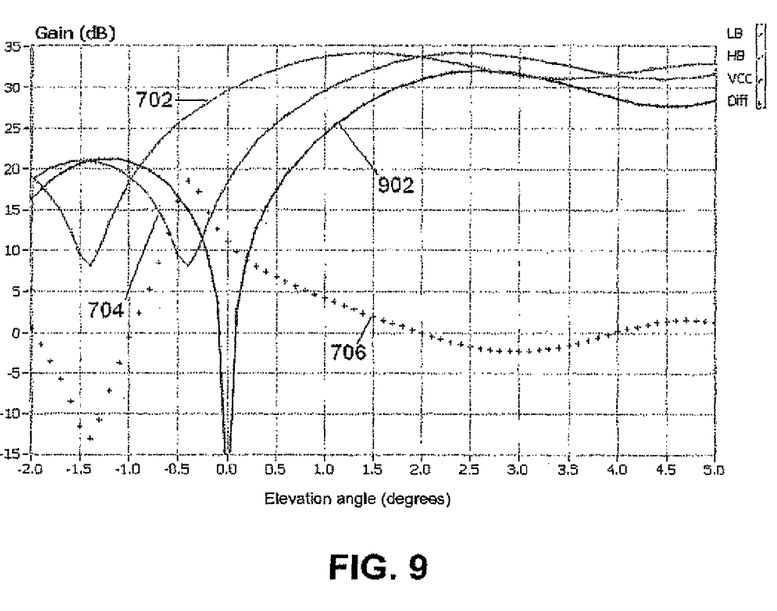
FIG. 9 describes a vertical antenna diagram indicating how coupling of low beam receive signals and high beam receive signals can result in significant reduction of clutter at an elevation of 0 degrees, as can be obtained using embodiments of the present invention.

In embodiments according to the present invention, the signals in the receive beams are coupled, allowing to obtain an improved reduction or even cancelling of clutter. The following two pictures illustrate how in the example coupling between a low beam and a high beam can be used for significantly reducing or cancelling clutter. FIG. 8 illustrates an example whereby coupling of signals in the low beam and the high beam results in cancelling of clutter at an elevation of −0.5 degrees. The blue solid line 802 shows the new vertical receive diagram if the coupling for this antenna from high beam to low beam is −16 dB and has a phase shift of 26 degrees. It can be seen that a sharp notch easily 40 dB deeper than the original antenna notch can be realized. For targets on higher elevation the receive pattern furthermore is not changed. When the coupling is made stronger to −11 dB and has a phase shift of −81 degrees the deep notch shifts to zero degrees elevation, as can be seen in the blue curve 902 in FIG. 9. For this (relative high elevation) clutter caused by obstructions at same height as the radar antenna, the receive pattern for targets on higher elevation is also affected, i.e. there is a penalty of about 2 dB of loss in gain for targets on higher elevation. The combined signal is represented by blue curve 802.

The present examples illustrate how reduction of clutter can be obtained. Calculations show that an improvement of 40 dB can be realized if the coupling is adjusted to better than $\frac{1}{10}$th of a dB and one degree accuracy in phase. The coupling parameters can be estimated by measuring the antenna or the use of two coherent receivers to measure the difference in clutter on both channels. It is expected that an adaptive tuning of the amplitude and phase of the coupling is the easiest and least expensive way to notch the clutter completely.

Figure 10:
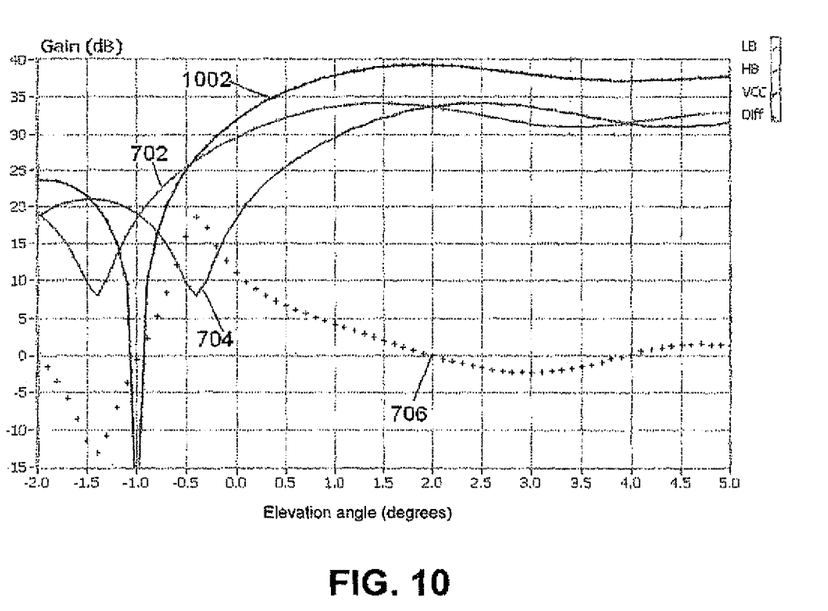
FIG. 10 describes a vertical antenna diagram indicating how coupling of low beam receive signals and high beam receive signals can result in increase of sensitivity in combination to a reduction of clutter.

It is an advantage of embodiments according to the present invention, that combining of receive signals of a first beam and receive signals of a second beam not only allows reduction of clutter, but furthermore may increase sensitivity of the detection system and/or expand its coverage volume. By way of illustration, FIG. 10 illustrates a coupling that places the notch at a lower clutter angle of −1 degree where the difference in amplitude between both beams is very small but since the phase is favorable, considerable gain can be obtained on the high elevations while still canceling the low angle clutter. Coupling parameters for the results shown in FIG. 10 are a coupling of 0 dB with a 63 degrees phase correction, resulting in combined or coupled signal 1002, represented by the blue line.

In the above examples the first negative sidelobe of the high beam was canceled using a signal from the low beam antenna. As clutter can result from even lower elevation angles it is possible that the second sidelobe of the low beam needs to be suppressed. The latter may for example be performed by reducing (attenuating) the weight of the high beam as the low beam is already completely coupled (0 dB).

It is to be understood that although preferred embodiments, specific constructions and configurations, as well as materials, have been discussed herein for devices according to the present invention, various changes or modifications in form and detail may be made without departing from the scope of this invention as defined by the appended claims. For example, whereas the embodiments above are often illustrated for radar detection systems, these can also be applied to sonar detection, or more generally to any system for detection of objects of interest based on detection of an echo signal wherein at least two receive beams for receiving a response under a different angle are provided.

The invention claimed is:

1. A system for suppressing unwanted signals when detecting objects of interest with a detection system comprising an air traffic control radar scanning antenna system using two or more receive beams, comprising
   an input means arranged to obtain from said antenna system receive signals from a first receive beam and receive signals from at least one second receive beam responsive to the same emission signal;
   a coupling means arranged to couple the receive signals from the first receive beam to the receive signals from the at least one second receive beam, so as to obtain a detection signal for the objects of interest with suppressed unwanted signal contribution;
   means for dividing the region, covered by the detection system, in different azimuth-range cells;
   a calibration processor for deriving coupling parameters for coupling the receive signals of the first beam and receive signals of the at least one second receive beam so as to obtain a detection signal for the objects of interest with suppressed unwanted signal contribution; and
   whereby different coupling parameters are derived for different azimuth-range cells.

2. The system according to claim 1, wherein the calibration processor is arranged to derive coupling parameters so that a part of the received signals of the first beam is combined with the received signals of the second beam, with the part of the received signal of the first receive beam introducing an unwanted signal at a predetermined location being equal in amplitude as but in counter phase with an unwanted signal at the predetermined location present in the received signals of the second beam.

3. The system according to claim 1, wherein the coupling parameter comprises a coupling amplitude and/or phase angle.

4. The system according to claim 1, wherein the coupling parameters are tuned by iteration from scan to scan.

5. The system according to claim 1, wherein the coupling means is arranged to endure a local electronic notch in the detection signal at a position of an unwanted signal contribution.

6. The system according to claim 1, wherein the detection signal expresses a presence or property of an object as function of an azimuth angle, elevation and range with respect to the antenna system, and wherein the coupling means substantially reduces or cancels the detection signal for a selected elevation angle.

7. The system according to claim 1, wherein the coupling means is arranged to couple the receive signals differently as a function of a range between an object for which a receive signal is obtained and the antenna system.

8. The system according to claim 1, wherein the coupling means furthermore is arranged to couple the receive signals in phase for detection signals wherein no unwanted signals are present.

9. The system according to claim 1, wherein the coupling means comprises vector modulators for modulating the receive signals for the first beam and the receive signals for the second beam, and a combiner for combining the modulated received signals.

10. The system according to claim 1, wherein the coupling means adaptively is tuned to null unwanted signals by adaptively altering a coupling amplitude and phase.

11. The system according to claim 1, wherein the coupling means is arranged to provide a coupling taking into account gain as function of elevation azimuth and range.

12. A detection system for detecting objects of interest, the detection system comprising an antenna system arranged to obtain two or more receive beams and to determine a detection signal of objects of interest, and a system for reducing or cancelling unwanted signals in the detection signal of the objects of interest according to claim 1.

13. A calibration processor for use in a system according to claim 1, wherein the processor is arranged to determine coupling parameters for coupling receive signals from the first receive beam and receive signals from the second receive beam.

14. A method for detecting objects of interest, the method comprising:
   emitting an emission signal towards a region of interest;
   receiving receive signals in a first beam and receive signals in a second beam, being an echo response to the same emission signal;
   coupling said receive signals in a first beam to said receive signals in a second beam so as to obtain a coupled signal being a detection signal for objects in the region of interest having suppressed unwanted signals;
   dividing the region of interest in different azimuth-range cells;
   deriving coupling parameters for said coupling the receive signals of the first beam and receive signals of the at least one second receive beam so as to obtain a detection signal for the objects of interest with suppressed unwanted signal contribution; and
   whereby different coupling parameters are derived for different azimuth-range cells.

15. A method for upgrading a detection system comprising an antenna using two or more receive beams and a means for switching between the two or more receive beams, the method comprising:
- replacing the switching means by a means for coupling said receive signals in a first beam to said receive signals in a second beam so as to obtain a coupled signal being a detection signal for objects of interest having suppressed unwanted signals;
- dividing the region covered by the detection system in different azimuth-range cells;
- deriving coupling parameters for said coupling the receive signals of the first beam and receive signals of the at least one second receive beam so as to obtain a detection signal for the objects of interest with suppressed unwanted signal contribution;
- whereby different coupling parameters are derived for different azimuth-range cells.

* * * * *